Robert E. Brooks,
Lee O. Heflinger,
Ralph F. Wuerker,
INVENTORS.

BY.

United States Patent Office 3,519,322
Patented July 7, 1970

3,519,322
METHOD FOR ENCODING AND DECODING INFORMATION
Robert E. Brooks, Lee O. Heflinger, and Ralph F. Wuerker, Los Angeles, Calif., assignors to TRW Inc., Redondo Beach, Calif., a corporation of Ohio
Filed July 19, 1967, Ser. No. 661,492
Int. Cl. G02b 27/10
U.S. Cl. 350—3.5                              1 Claim

ABSTRACT OF THE DISCLOSURE

Information encoder-decoder system and method wherein to encode a message, coherent radiant energy is formed into a hologram recording scene beam and a hologram recording reference beam. A ground glass beam diffuser is positioned in the scene beam to form a diffused scene beam which is passed through a message-bearing transparency. Another ground glass member is supported in the reference beam at a predetermined distance from a first film plane to form a diffused reference beam intersecting the diffused scene beam at the first film plane to form an interference pattern. An image recorder in the form of a photographic plate is supported and exposed to the intersecting beams at the first plane. The image recorder is then developed to form a hologram of the interference pattern. In order to decode the message, similar coherent radiant energy is formed into a hologram reconstruction beam. The other glass member is then supported in the reconstruction beam and located at a distance from a second film plane which is substantially equal to the predetermined distance utilized in recording the message to diffuse the reconstruction beam toward the second film plane. The hologram is supported at the second film plane for viewing of the message therethrough. In decoding the message, the identical piece of glass that was used in encoding the message, with its unique, random-phase characteristics, must be utilized in reconstructing or decoding the message. Any attempts to reconstruct the message with reconstruction beams not having the decoder glass medium therein result in an unintelligible reconstruction.

BACKGROUND OF THE INVENTION

Field of the invention

This invention relates generally to data encoder and decoder method and apparatus, and more particularly relates to such method and apparatus whereby messages or information can be encoded and decoded by utilizing holographic recording and image reconstruction.

Description of the prior art

Many applications require that information be transmitted from one place to another in secrecy. In order to achieve such secrecy the transmission medium must be altered so it is unintelligible to anyone not having the necessary equipment to restore it to its original form. Not only is the equipment necessary, but before the message can be decoded the key to the original alterations must be had. U.S. Pat. Nos. 3,166,625 and 3,178,993 reveal and describe prior art devices of interest which are concerned with the encoding and decoding of information.

SUMMARY OF THE INVENTION

An information encoder-decoder system and method wherein provision is made for forming hologram decording scene and reference beams of like predetermined coherent radiant energy. Provision is also made for the forming of a hologram reconstruction beam of like radiant energy. And means are provided for selectively altering the reference and reconstruction beams to encode information carried by the scene beam and to decode information carried by a hologram, respectively.

DESCRIPTION OF THE PREFERRED EMBODIMENT

Figure 1:
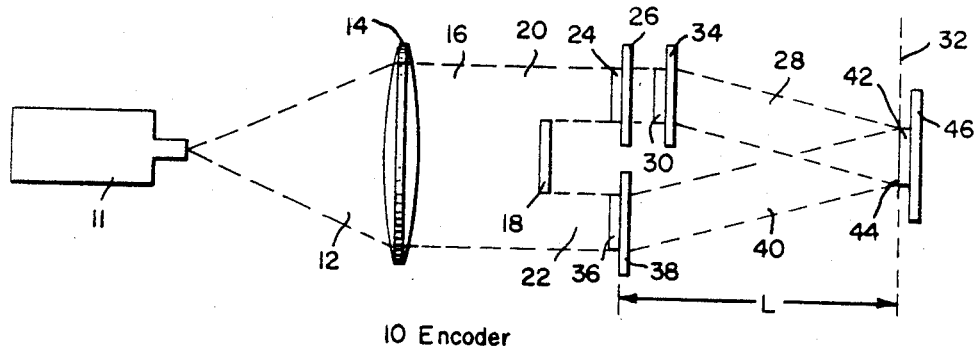
FIG. 1 shows in schematic form a plan view of the message encoding and decoding system of the invention.
Figure 1:
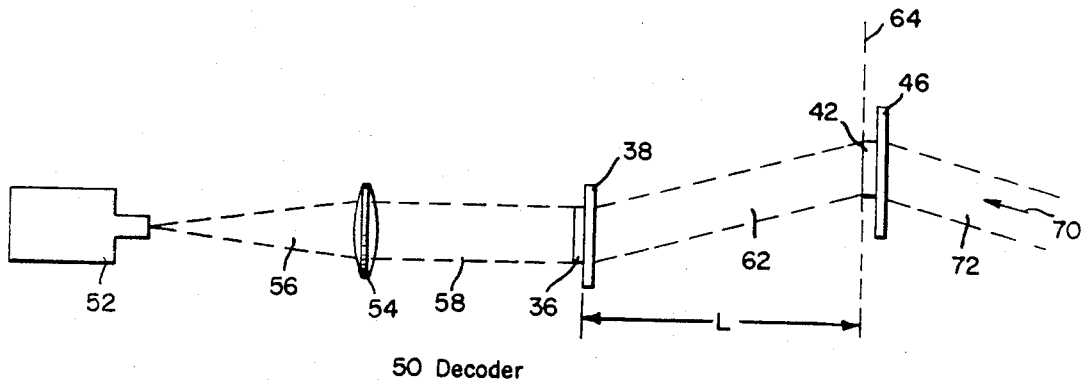

Referring to FIG. 1, the encoder apparatus of the system is generally designed by the numeral 10 and is provided with a pulsed laser generator 11 for generating a beam of monochromatic radiant energy 12 toward a lens 14. The generator 11 could be a ruby laser, a helium-neon continuous laser, or any other laser capable of generating energy of a predetermined wavelength. The lens 14 is preferably a collimating lens which serves to direct energy in a first parallel ray beam 16.

A screen member 18 is positioned in the beam 16 for forming a hologram recording scene beam 20 and a recording reference beam 22. The screen member 18 is preferably fashioned from material opaque to the generated radiation and positioned substantially in the center of the beam 16.

Figure 2:
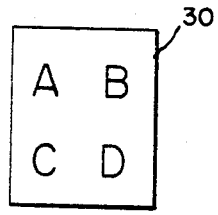
FIG. 2 shows an elevational view of the message bearing transparency usable in the system of FIG. 1.

A beam diffuser 24, preferably a transparency fashioned from ground glass, or the like, is positionable as by a slide 26 in the scene beam 20 and serves to form the beam 20 into a diffused scene beam 28 passing through a message bearing transparency 30 toward a film plane 32. A slide 34 supports the transparency 30 in the beam 20. The transparency 30 can be a developed negative film plate carrying information, for example, as illustrated in FIG. 2.

A beam diffuser or encoder-decoder 36 is also positionable as by the slide 38 in the reference beam 22 for the purpose of forming or altering the reference beam 22 in a predetermined manner so as to produce a diffused reference beam 40 intersecting the diffused scene beam 28 at the film plane 32. Preferably the diffuser 36 is also fashioned from ground glass or the like, and is located at a predetermined distance L from the film plane 32 with the direction of incidence of the beam 22 normal to the surface of the diffuser 36, as shown.

An image recorder means such as a high resolution photographic plate 42 which is sensitive to the radiant energy generated by the laser 11 is positioned with the emulsion surface 44 at the film plane 32 as by means of the slide 46.

Operation of the encoder apparatus 10 of FIG. 1 is begun by first causing the laser generator 11 to generate a pulse of coherent radiant energy 12 which is directed toward the lens 14. After passage through the lens 14 the pulse of energy emerges as a parallel ray beam 16 heading for the screen member 18. Due to the opacity to radiation and position of screen member 18, the beam 16 is divided into the scene beam 20 and the reference beam 22. The diffuser 24 positioned in the beam 20, causes the beam to diffuse through the message bearing transparency 30 and emerge as a diffused scene beam 28 carrying the message which is directed toward the first film plane 32. The encoder-decoder diffuser 36 positioned in the reference beam 22 alters or codes the beam 22 into a diffused reference beam 40 which intersects the diffused scene beam 28 at the film plane 32 to produce an interference pattern. The emulsion surface 44 of the plate 42 positioned at the film plane 32 serves to record the interference pattern thus produced. Development of the plate 42 provides the hologram bearing the coded message.

Still referring to FIG. 1, the decoder of the system is generally designated by the numeral 50 and is provided with a radiant energy hologram reconstruction beam generator 52 which emits a continuous, monochromatic energy beam 56 toward a lens 54 having the same wavelength as the energy generated by the pulsed laser generator 11 used in the recording of information on the plate 42. The reconstruction beam laser 52 could be, for example, a helium-neon, continuous beam laser, it being required only that it be of the same type as was used in the recording of the hologram. The lens 54 is also a collimator lens and directs energy from the laser generator 52 in a parallel ray or reconstruction beam 58. The same slide 38 can be utilized to provide the means whereby the beam diffuser 36 can also be positioned in the beam 58 for message decoding and hologram reconstruction purposes. Positioning of the diffuser 36 in the beam 58 effects a diffused reconstruction beam 62 which has unique, random-phase characteristics exactly the same as those of the altered reference beam 22 of the encoder apparatus 10. As in the encoder apparatus, the slide 46 can be used to position the developed plate 42, or hologram, as it is now referred to, at the film plane 64. Viewing of the hologram 42 is accomplished by sighting at 70 along the emerging beam 72.

In positioning the diffuser 36 in the beam 58 for message decoding purposes, it is necessary not only to re-establish the distance L between the diffuser 36 and the plate 42 which was used in the encoding of the information, but also the other coordinates of the diffuser 36 relative to the hologram 42. It will be appreciated in all there are six possible degrees of freedom for the coder 36 relative to the hologram 42, three of translation and three of rotation. All of these must be the same during the decoding of the message as they were during the encoding of the message in order for the message to be effectively decoded. Moreover, the diffuser 36 must be repositioned such that the direction of incidence of the beam 58 with respect to it is the same as the direction of incidence of the beam 22 to the beam diffuser 36 as utilized in the encoder apparatus 10 to provide successful decoding of the message.

Operation of the decoder 50 in decoding the information carried by the hologram 42 is commenced by the actuation of the laser generator 52 which is caused to produce a beam 56 of continuous coherent radiant energy of the same character as the energy generated by the generator 11. The beam 56 passes through the collimator lens 54 and emerges as a parallel ray beam 58. The beam 58 in passing through the diffuser 36 is diffused into the beam 62 in exactly the same manner that the beam 22 was diffused in the encoder apparatus 10. The diffused beam 62 emerges from the hologram 42 as a beam 72 which can be viewed at 70 to provide a virtual image of the message, as shown, thus effecting a decoding of the previously encoded message.

In summary it will be appreciated that the identical ground glass diffuser 36 must be used in decoding the coded message or else attempts to decode the message either by the use of another beam diffuser or medium or no diffuser at all, result in unintelligible hologram reconstructions.

It is to be understood that a hologram of the message could be made by utilizing two or more beam diffusers such as the beam diffuser 36 in series. In such case all the diffusers would have to be arranged in series in order to decode the message. It is to be further understood that if two or more decoding keys are desired, they can be obtained by making separate identical holograms of the complex wavefronts emerging from a diffuser such as the diffuser 36. Each of the holograms can then be used in place of the diffuser 36 to decode the message encoded by the diffuser 36. Because of the properties of holograms to accurately reconstruct recorder waves, these holograms serve as decoders which are identical to the diffuser. It is thus readily apparent that the invention described herein is not limited to the illustrative embodiment shown in FIG. 1, but may be accomplished by numerous methods of implementation as will be apparent to those skilled in the art.

What is claimed is:
1. A method of encoding and decoding information comprising the steps of:
   forming a hologram of a light diffusing member;
   generating hologram recording scene and reference laser beams;
   passing said scene beam through a diffuser and then through an information bearing transparency;
   passing said reference beam through said light diffusing hologram to intersect said scene beam at an image recorder;
   processing said image recorder to form a hologram of said information bearing transparency;
   generating a hologram reconstruction lase beam;
   passing said reconstruction beam through said information bearing transparency hologram; and
   positioning said light diffusing hologram in said reconstruction beam between said generating hologram reconstruction laser beam and said information bearing transparency hologram to reveal the information of said information bearing transparency hologram.

References Cited

George Ballard, Invest. of Laser Properties Relevant to the Meas. of Diff. Phys. Param.

"Factors Contrib. to the Degredation of Holographic Images," Dec. 1, 1966, Arkansas Univ., N 67, 19467.

Leith et al., "Wavefront Reconstruction . . . Objects," Nov. 1964, JOSA, vol. 54, No. 11, pp. 1295–1301.

Jacobson et al., "Holograms Produced . . . Illumination," Applied Optics, Nov. 1965, vol. 4, No. 11 pp. 1509–1510.

Stroke et. al., "Two-Beam . . . Hologram," Applied Physics, Jan. 1966, vol. 8, No. 2, pp. 42–44.

Leith et al., "Holographic Imagery . . . Media," JOSA, Apr. 1966, vol. 56, No. 4, p. 523.

DAVID SCHONBERG, Primary Examiner

P. A. SACHER, Assistant Examiner